Figure 1:
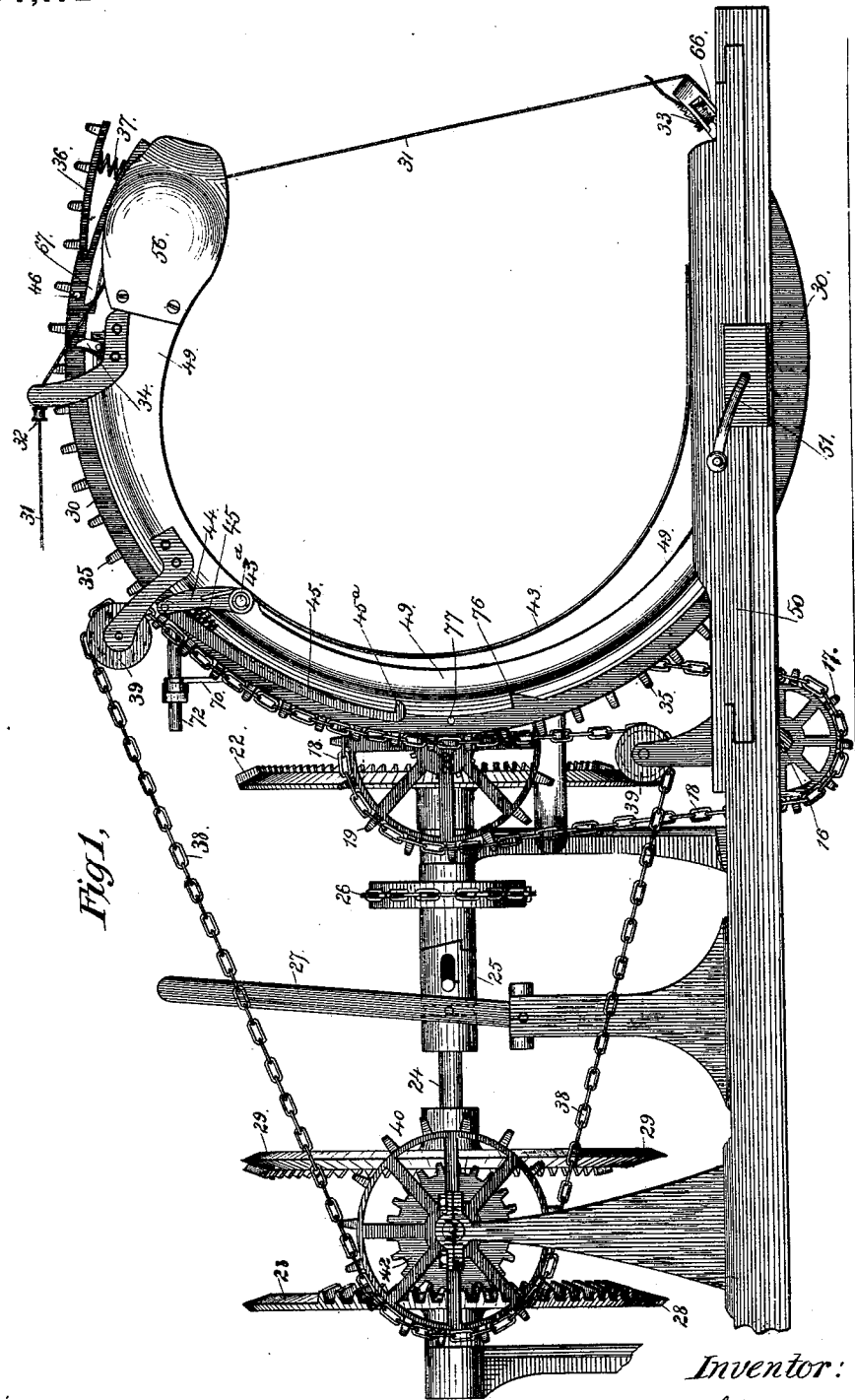

(Model.)  3 Sheets—Sheet 1.

B. CHAMBERLAIN.
Grain Binder.

No. 234,172. Patented Nov. 9, 1880.

Attest:
Geo. T. Smallwood Jr.
Walter Allen

Inventor:
Blanchard Chamberlain
By Knight Bros
attys.

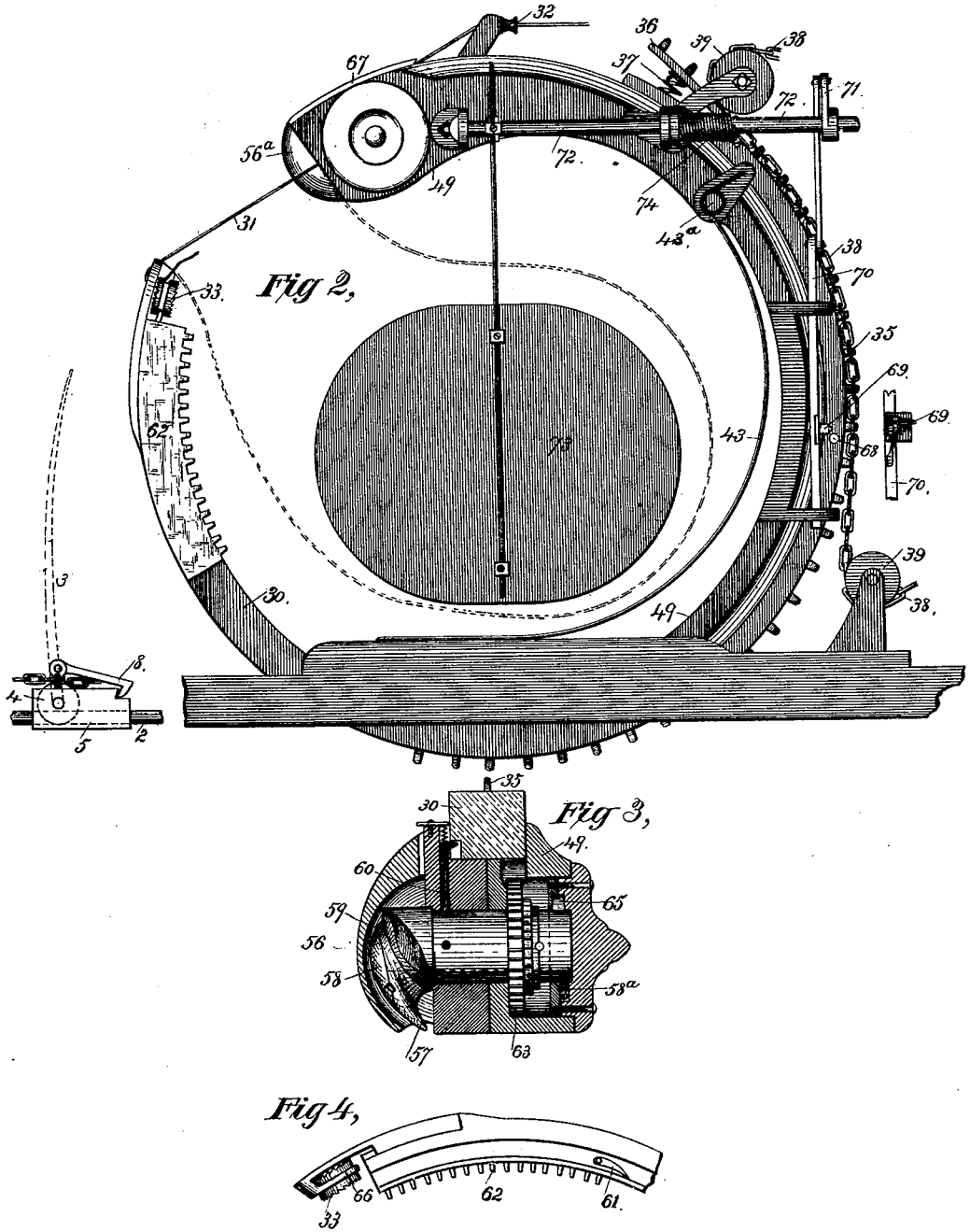

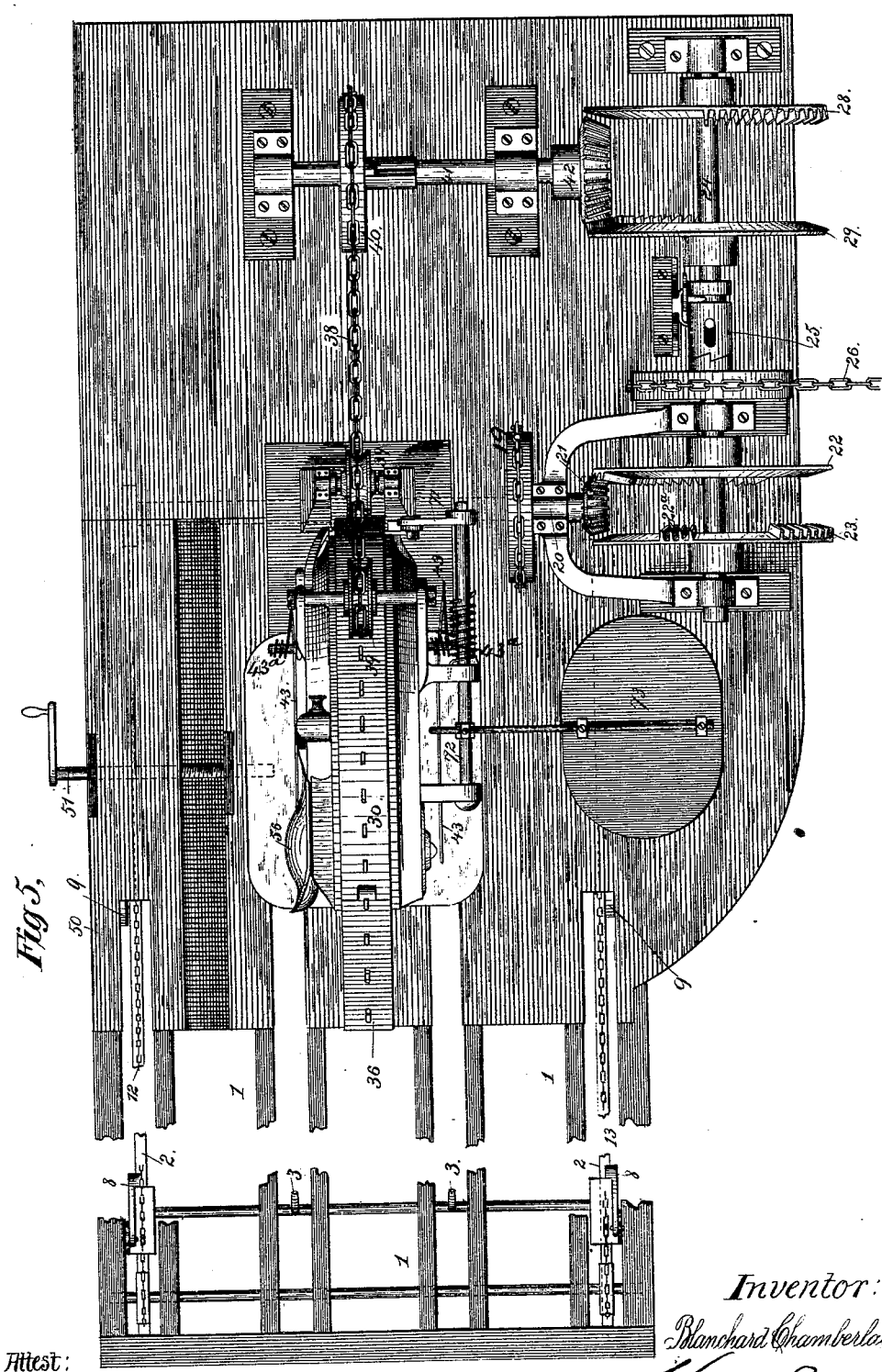

UNITED STATES PATENT OFFICE.

BLANCHARD CHAMBERLAIN, OF BELLEFONTAINE, OHIO, ASSIGNOR OF ONE-HALF OF HIS RIGHT TO JAMES B. NIVEN, OF SAME PLACE.

GRAIN-BINDER.

SPECIFICATION forming part of Letters Patent No. 234,172, dated November 9, 1880.

Application filed March 12, 1880. (Model.)

*To all whom it may concern:*

Be it known that I, BLANCHARD CHAMBERLAIN, residing at Bellefontaine, in the county of Logan and State of Ohio, have invented Improvements in Grain-Binders, of which the following is a specification.

My invention relates to a machine of the same general character as that described in my application for Letters Patent filed June 12th, 1879, for binding grain with cord, said machine having a horizontal rake and a grain throat or receiver, in which the gavel is held while the cord is taken around it by a segmental cord-carrier having a movement around the grain within the throat, and is fastened by a rotary knot-tyer.

In my present improvements I impart a reciprocating motion to the chains carrying the hinged rake by means of paired segment-gears engaging alternately with a pinion on the driving-shaft of the rake, and I drive the gaveling and binding mechanism by means of another pair of cogged segments in similar manner, the parts being so combined and arranged that the raking and binding mechanisms operate alternately, each while the other is at rest.

The grain throat or receiver is made adjustable to suit grain of different length or height, and is provided with an independent segment-arm for compressing the gavel within the throat before the cord is passed around it.

The cord-carrier consists of a segment-arm moved concentrically around the grain throat or receiver and operated by a chain engaging with sprocket-teeth on its back, said teeth terminating in a hinged and toothed arm for taking up the slack of the chain, as hereinafter described.

The reciprocating carrier is further provided with an internal segment for rotating the tyer, and with a switch operating as a tappet to release at the proper moment the lock by which the tyer is caught and held in its proper position while at rest.

The cord holder or nipper consists of a rotary toothed wheel operated by a spring-tooth to alternately seize the cord in a new place at each movement.

The tyer is provided with a cap, forming a guide to direct the cord beneath the hook, as required, and is constructed with a flange to deflect the cord over its heel in the rotary movement, avoiding the necessity for a separate pushing device to discharge the loop or knot.

The sheaf-discharger operates by contact with the butt of the sheaf, and consists of an arm provided with a flat plate and depending from a horizontal rock-shaft operated by a vertical slide having a spring-tooth which is active when moving in one direction only.

In the accompanying drawings, Figure 1 is a rear elevation of the gaveling and binding apparatus with the throat opened for the reception of the grain. Fig. 2 is a front view of the same, showing the position of the parts when the cord-carrier is closing around the grain. Fig. 3 is a view of the knot-tying apparatus on a larger scale, showing the tyer proper in elevation and its casing and other accessories in longitudinal section. Fig. 4 is a rear view of a portion of the cord-carrier, showing the cord-holder, the switch employed to release the tyer, and the rack for rotating the tyer. Fig. 5 is a plan of the machine on a smaller scale.

1 represents the grain-table of the raking attachment, which may have the form of a skeleton-frame, with guides 2 for the reception of the rake 3 4, the head 4 of which is pivoted in boxes 5 and carries hooks or catches 8, which engage over the ends of the slides 5, to hold the rake-teeth in erect position while in action, the slide-catches being thrown up by contact with inclined ribs 9, so as to release the teeth when they have carried the gavel into the grain-throat 49 and allow them to fall to a horizontal position in readiness for passing freely backward beneath the grain on the table.

The grain throat or receiver 49 is of C form, but with a flat horizontal bottom, and is mounted on a slide, 50, moved forward or backward by a screw, 51, or other suitable means, to adapt the position of the binding attachments to long or short grain. On their return or outward stroke the rake-teeth, coming in contact with the extremity of the frame or suitable tappets thereon, are turned into erect position, when the hooks 8 again engage with their boxes, so as to support the teeth in their effective vertical position.

The boxes or slides 5 of the rake are carried by chains 12 13, receiving a reciprocating movement from the sprocket-wheels on a shaft, 16, Fig. 1, which is driven by a sprocket-wheel, 17, from a chain, 18, on a driving sprocket-wheel, 19, the shaft 20 of which gears, by a beveled pinion, 21, with a pair of segment-gears, 22 23, on a clutch-shaft, 24, running loosely in its bearings, and connected at will, by means of a sliding clutch, 25, and chain 26, with the main driving-shaft of the machine. The clutch is thrown into gear by means of a lever, 27, at the will of the operator. The teeth of the segment-gears 22 23 are arranged alternately, so that the rake is moved backward by the gear 23, and immediately on the said gear leaving the pinion 21 the segment 22 engages therewith, so as to impart the active movement to the rake, in order to rake the grain from the platform and carry it into the grain-throat. The gear-wheel 22 has then a space without teeth, as shown in Fig. 5, leaving the rake at rest, while the cord-carrier begins its motion, as hereinafter described, after which a second short segment, 22ª, on the same wheel imparts an additional movement to the pinion in the same direction, so as to carry the teeth beneath the grain-throat and cause the rake to fall backward in readiness for the return movement. The same clutch-shaft, 24, carries a pair of segment-gears, 28 29, for advancing and retracting the segmental cord-carrier 30.

The cord-carrier is provided on its back with a rack, 35, of sprocket-teeth, terminating in a hinged arm or section, 36, pressed outward by a spring, 37, so as to engage with the driving-chain 38, to take up the slack of the same at the termination of the stroke. The driving-chain 38 is carried around idle-pulleys 39 39 and a sprocket-wheel, 40, on the shaft 41, by which the chain is driven, said shaft 41 receiving its motion from a beveled pinion, 42, with which the segment-gears 28 29 engage alternately to impart the reciprocating rotary motion to the carrier.

The segment-gears 22 23 and 28 29 are so arranged on their driving-shaft that the rake will be moved while the cord-carrier is at rest, and vice versa.

43 represents a sheaf-compressor, by which the gavel is compressed upwardly within the grain-throat while the cord is being carried around it. The said compressor is pivoted at 43ª, and is carried by an arm, 44, at the extremity of which is a rod, 45, having a hook, 45ª, on its end, engaged by a pin, 46, on the side of the cord-carrier 30 in the movement of the latter which carries the cord around the grain. The hook 45ª is then drawn by the spring 75 into a notch, 76, in the stationary grain-receiver, whereby the compressed gavel is securely held until the cord is carried around it. On the return movement of the cord-carrier a second pin, 77, engages with the inclined end of the hook 45ª, so as to throw it out of the notch 76, releasing the compressor, and permitting the spring 75, aided by the weight of the sheaf, to restore it to its retracted position in readiness for the reception of a new gavel. The cord is held by a spool of peculiar construction, as described in my former application, the said spool being adapted to pay out the cord to any extent and to maintain constant and uniform tension thereon until depleted.

The cord 31 is carried through an eye, 32, and secured to the end of the cord-carrier 30 by means of a holder, 33, which consists of a compound ratchet-wheel having two sets of teeth, the upper or outer set being employed to catch and hold the cord, while the lower or inner set of ratchet-teeth engage at the return movement of the cord-carrier with a spring-tooth, 34, on the grain throat or receiver, in order to rotate the cord-holder the distance of one tooth and cause it to take a new gripe on the cord.

The tying of the knot is effected in the following manner: The cord, having been drawn around the grain by the concentric movement of the carrier 30 around the open front of the receiver or throat 49, as illustrated in Fig. 2 in dotted lines, is caught by the stationary cap 56 of the tyer, and is guided by an internal protuberance or lip, 56ª, beneath the rotary hook 57, and passes over a rear flange, 59, employed for the purpose of causing the discharge of the loop, through which a bight of the cord is drawn in the act of forming the knot. The rotary hook is held in its proper position to receive the cord while at rest by means of a spring-pin, 60, engaging with an opening in its shaft, and retracted at the proper moment when the tyer is to be released by means of a tappet-switch, 61, on the face of the cord-carrier, which is so formed and arranged as to pass over the head or retracting-arm of the pin in the forward or upward movement of the cord-carrier, and to pass under it on the return movement. The tyer, being thus released, receives the necessary rotation by a rack, 62, on the inner face of the cord-carrier, engaging with a toothed rim, 63, which has a ratchet-connection with the annular shaft of the tyer, so as to rotate it forward on the downward movement of the cord-carrier, but impart no motion to it on its upward movement. The opening of the nipper 58 of the tyer is effected by means of a pin, 58ª, projecting from the rod of said nipper, which slides within the annular shaft of the tyer, and engaging with a stationary cam-groove or flange, 65, within the head of the grain-receiver 49, so as to throw the nipper outward at the proper moment to allow the cord to enter and then restore it, firmly griping the cord. The continued rotation of the tyer then causes that portion of the cord which passes over the back of the nipper to be thrown off by the rear flange, 59, slipping completely over the bight which has been griped in the nipper, so as to draw the said bight through the loop and complete the knot. The cord, extending from the tyer to the spool, having been caught by a hook, 66, on the extremity of the carrier 30, is guided by the said hook in front of the next tooth of the wheel 33, so that the rotation of the said wheel by contact with the spring-tooth 34 will cause the cord to be firmly held in a new place, after which that portion extending to the sheaf is severed by contact with a stationary knife, 67, on the head of the grain-receiver 49.

On the front side of the cord-carrier is a tooth, 68, employed to act on a spring-catch, 69, on a vertical sliding rod, 70, connected at its upper end with an arm, 71, on a horizontal rock-shaft, 72, carrying a sheaf-discharger, 73, which, after the completion of the sheaf, strikes the butt thereof to eject it from the throat, the rock-shaft 72 being provided with a spring, 74, to restore the discharger to its upper position when released.

By setting the tyer in a socket prepared for it in the solid body of the grain-throat, instead of in a separate box, as described in my former application, I bring it down close to the surface of the sheaf, and so avoid any slack in the cord when the knot is completed.

Having thus described my invention, the following is what I claim as new and desire to secure by Letters Patent:

1. The combination of a suitable raking mechanism, the cord-carrying hoop or segment 30, provided with sprocket-teeth on its back, the driving-shaft 24, provided with two pairs of segment-gears, the pinions 21 42, counter-shafts 20 41, sprocket-wheels 19 40, and chains 18 38, all substantially as herein described, to impart intermittent reciprocating motion to the raking mechanism and cord-carrier alternately, each while the other is at rest.

2. A cord-carrying hoop or segment, 30, provided with a hinged arm, 36, pressed outward by a spring, 37, for the purpose of taking up the slack of the driving-chain, as described.

3. The combination of the grain-throat 49, cord-carrier 30, compressor 43, arm 44, hooked rod 45 45$^a$, and pin 46 with suitable mechanism for actuating the cord-carrier, substantially as herein set forth.

4. The combination, with the reciprocating cord-carrier 30 and rotary knot-tyer 57, of the spring-pin 60 and the tappet-switch 61, as and for the purposes set forth.

5. The sheaf-discharger 73, rock-shaft 72, slide 70, and spring-tooth 69, constructed and operating substantially as and for the purposes set forth.

6. The combination, with the grain throat or receiver 49, reciprocating cord-carrier 30, intermittently-rotated cord-holder 33, guide 32, and tyer 57, operating substantially as herein described, of the knife 67, projecting inwardly from the face of the grain-receiver near its upper extremity, for the purpose of severing the cord on the return movement of the carrier, as explained.

BLANCHARD CHAMBERLAIN.

Witnesses:
OCTAVIUS KNIGHT,
WALTER ALLEN.